(12) United States Patent  
Robertson

(10) Patent No.: US 11,411,759 B2  
(45) Date of Patent: Aug. 9, 2022

(54) EMULATING BROADCAST IN A NETWORK ON CHIP

(71) Applicant: SIEMENS INDUSTRY SOFTWARE INC., Plano, TX (US)

(72) Inventor: Iain Robertson, Bedfordshire (GB)

(73) Assignee: SIEMENS INDUSTRY SOFTWARE INC., Plano, TX (US)

(*) Notice: Subject to any disclaimer, the term of this patent is extended or adjusted under 35 U.S.C. 154(b) by 182 days.

(21) Appl. No.: 16/940,960

(22) Filed: Jul. 28, 2020

(65) Prior Publication Data

US 2021/0036880 A1  Feb. 4, 2021

(30) Foreign Application Priority Data

Jul. 29, 2019  (GB) ...................................... 1910810

(51) Int. Cl.
*H04L 12/18* (2006.01)
*H04L 47/34* (2022.01)

(52) U.S. Cl.
CPC .......... *H04L 12/1881* (2013.01); *H04L 47/34* (2013.01)

(58) Field of Classification Search
CPC ... H04L 12/16; H04L 12/184; H04L 12/1854; H04L 12/1881; H04L 47/10; H04L 47/15; H04L 47/17; H04L 47/24; H04L 47/2441; H04L 47/2458; H04L 47/2483; H04L 47/34
See application file for complete search history.

(56) References Cited

U.S. PATENT DOCUMENTS

| 2005/0203988 | A1 | 9/2005 | Nollet et al. |
| 2007/0266223 | A1* | 11/2007 | Nguyen ............... G06F 9/38 712/241 |
| 2011/0103302 | A1* | 5/2011 | Hall ..................... H04W 4/90 370/328 |

(Continued)

FOREIGN PATENT DOCUMENTS

| CN | 107852379 A * | 3/2018 | ............. H04L 45/14 |
| EP | 1562124 A3 * | 9/2005 | ............. G06F 15/16 |

(Continued)

OTHER PUBLICATIONS

Ebrahimi et al., "Partitioning methods for unicast/multicast traffic in 3D NoC architecture," Design and Diagnostics of Electronic Circuits and Systems, 2010, pp. 127-132.
Rodrigo et al., "Efficient unicast and multicast support for CMPs," Microarchitecture, 2008, pp. 364-375.

(Continued)

*Primary Examiner* — Kevin D Mew
(74) *Attorney, Agent, or Firm* — Lempia Summerfield Katz LLC

(57) ABSTRACT

An integrated circuit chip has a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent, wherein each unit is configured to: receive a packet having one of the plurality of tiers; determine the tier of the received packet; and sequentially send packets having a different tier to the tier of the received packet to each of the respective subset of destination units for the different tier.

20 Claims, 3 Drawing Sheets

(56) References Cited

U.S. PATENT DOCUMENTS

| | | | | |
|---|---|---|---|---|
| 2012/0002675 | A1* | 1/2012 | Kauschke | H04L 49/1584 370/400 |
| 2014/0269765 | A1* | 9/2014 | Felch | H04J 3/0638 370/469 |
| 2015/0198997 | A1* | 7/2015 | Ting | G06F 1/3215 713/340 |
| 2018/0183901 | A1* | 6/2018 | Lariviere | G06Q 40/08 |
| 2019/0007346 | A1* | 1/2019 | Johnsen | H04L 49/358 |
| 2021/0320820 | A1* | 10/2021 | Ruan | H04L 41/12 |

FOREIGN PATENT DOCUMENTS

| | | | | |
|---|---|---|---|---|
| EP | 3223172 | A1 * | 9/2017 | |
| WO | WO-0229594 | A1 * | 4/2002 | G06F 13/107 |

OTHER PUBLICATIONS

Wachter et al., "BrNoC: A broadcast NoC for control messages in many-core systems," Microelectronics Journal, vol. 68, 2017, pp. 69-77.

Ebrahimi, Masoumeh, et al. "Partitioning methods for unicast/multicast traffic in 3D NoC architecture." 13th IEEE Symposium on Design and Diagnostics of Electronic Circuits and Systems. IEEE, 2010. pp. 127-132.

European Search Report for European Application No. 20187413.8-1203 / 3779714 dated Feb. 18, 2021.

Rodrigo, Samuel, et al. "Efficient unicast and multicast support for CMPs." 2008 41st IEEE/ACM International Symposium on Microarchitecture. IEEE, 2008. pp. 364-375.

Wachter, Eduardo, et al. "BrNoC: A broadcast NoC for control messages in many-core systems." Microelectronics Journal 68 (2017): 69-77.

* cited by examiner

EMULATING BROADCAST IN A NETWORK ON CHIP

FIELD OF THE INVENTION

This invention relates to transporting data within a Network on Chip (NoC).

BACKGROUND

Market demand for smaller products coupled with advances in semiconductor technology has led to the development of System on Chip (SoC) devices. In such devices, the multiple core devices of an embedded system are integrated onto a single chip. The traffic in the embedded system is conveyed over internal buses, thus connection of monitoring tools directly to the system bus is no longer possible. The resulting reduced access coupled with an increasing quantity of data being transported around the chip (due to developments of such technology leading to integration of multiple processing cores and higher internal clocking frequencies), has reduced the ability of external monitoring tools to monitor the system for security breaches, bugs, and safety concerns within the timescales demanded by the industry. Additionally, when multiple core devices are embedded onto the same single chip, the behaviour of each individual core device differs from its behaviour in isolation due to its interaction with the other core devices as well as real time events such as triggers and alerts.

In large SoC designs, it is often desirable to use a Network on Chip (NoC) as the transport mechanism for messages sent between components. It may be desirable to send a message to all devices within the NoC simultaneously. For example, such networks may distribute a trigger indicating a security breach, to which the devices need to respond quickly.

NoCs cannot typically support broadcasting of messages from one device to a plurality of other devices. Instead, messages are sent serially to each device in the network. It can be very time consuming to send messages in a serial manner to each module.

There is a need for a method which is able to emulate broadcasting in a NoC to allow messages to be distributed to multiple network components as quickly as possible.

SUMMARY OF THE INVENTION

According to a first aspect, there is provided an integrated circuit chip comprising a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent, wherein each unit is configured to: receive a packet having one of the plurality of tiers; determine the tier of the received packet; and sequentially send packets having a different tier to the tier of the received packet to each of the respective subset of destination units for the different tier.

Each unit may be configured to sequentially send packets to each of the respective subsets of destination units for the tiers above the tier of the received packet.

Each of the units may be further configured to specify, for each tier, a number of packets of that tier to be generated by that unit and, upon receiving a packet, generate the specified number of packets for the different tier.

A first unit of the plurality of units may be configured to sequentially send packets having a first tier to a first subset of the units, each of the first subset of units being configured to subsequently sequentially send packets having a second tier to each of a second subset of the units, wherein the first tier is lower than the second tier.

Each of the first subset of units may be further configured to subsequently sequentially send packets having the second tier to each of a third subset of the units.

Each of the second subset of units may be configured to, upon receiving a packet from one of the first subset of units, subsequently send a packet having a third tier to each of a fourth subset of the units, wherein the second tier is lower than the third tier.

Each communication unit may be configured to sequentially send packets having a lower tier to their respective subset of destination units before packets having a higher tier.

The number of tiers may be less than or equal to four. There may be a greater number of tiers.

The plurality of communication units may comprise a network and each unit may be configured to communicate with an entity exterior to the network.

Each of the units may be configured to convert the format of a message received at that unit from its respective entity from the message format used by the entity to the message format used by the network.

Each of the plurality of units may comprise a message interface and, upon receiving a packet, each unit may be configured to display an element of the data comprising the packet on its respective message interface.

The packet may comprise data that specifies the tier of the packet.

The packet may comprise a header and a payload, the header comprising data that specifies the tier of the packet.

The packet may comprise a trigger.

The packet may comprise an AXI transaction.

According to a second aspect, there is provided a method for implementation on an integrated circuit chip comprising a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent, the method comprising: receiving a packet having one of the plurality of tiers; determining the tier of the received packet; and sequentially sending packets having a different tier to the tier of the received packet to each of the respective subset of destination units for the different tier.

The method may comprise sequentially sending packets to each of the respective subsets of destination units for the tiers above the tier of the received packet.

The method may comprise sequentially sending packets having a lower tier to their respective subset of destination units before packets having a higher tier.

The number of tiers may be less than or equal to four. There may be a greater number of tiers.

The plurality of communication units may comprise a network and each unit may be configured to communicate with an entity exterior to the network.

Each of the units may be configured to convert the format of a message received at that unit from its respective entity from the message format used by the entity to the message format used by the network.

The packet may comprise data that specifies the tier of the packet.

The packet may comprise a header and a payload, the header comprising data that specifies the tier of the packet.

The packet may comprise a trigger.

The packet may comprise an AXI transaction.

BRIEF DESCRIPTION OF THE DRAWINGS

The present disclosure will now be described by way of example with reference to the accompanying drawings. In the drawings.

DETAILED DESCRIPTION

The following disclosure describes a system and method for emulating broadcast in a network on an integrated circuit chip. The integrated circuit chip may be a SoC or a multi-chip module (MCM).

Figure 1:
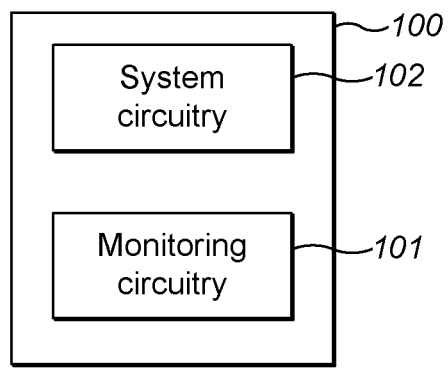
FIG. 1 is a schematic drawing of an exemplary monitoring architecture on an integrated circuit chip.
Figure 2:
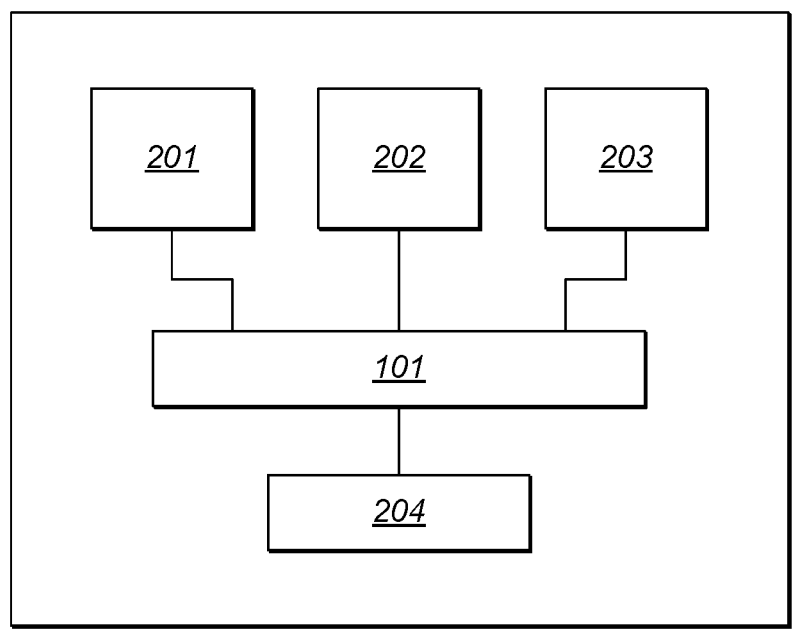
FIG. 2 is a schematic drawing of an exemplary monitoring architecture on an integrated circuit chip.

FIGS. 1 and 2 are schematic diagrams of exemplary monitoring architectures for a SoC, and components within monitoring architectures. The system may be monitored for situations such as security breaches, bugs, and safety concerns. These figures present the structures in terms of functional blocks. Some functional blocks for carrying out functions well known in the art have in places been omitted from these figures.

FIG. 1 illustrates the general structure of an exemplary monitoring architecture for a SoC 100. Monitoring circuitry 101 is arranged to monitor system circuitry 102. FIG. 2 illustrates exemplary system circuitry comprising local subsystems, which in this example are core devices, and a communication interface. Core devices 201, 202 and 203 of the SoC are each connected to monitoring circuitry 101. Although FIG. 2 illustrates three core devices, any number of core devices can be suitably integrated into the monitoring architecture. The core devices may run an operating system, for example a RTOS (real-time operating system), run software, or may store data. Exemplary core devices include a DSP (digital signal processor), video processor, applications processor, CPU, graphics processor, system memory, bus, system interconnect, custom circuit and a data engine. However, any component of a SoC is suitable for being incorporated into the monitoring architecture as a core device on FIG. 2. The core devices may be emulators or simulators of other devices on the chip. For example, a core device may emulate a processor.

The monitoring circuitry is able to monitor the operation of the core devices, and optionally also able to manipulate the operation of the core devices. The monitoring circuitry is connected to a communication interface 204. Communication interface 204 may be configured to communicate with entities off-chip. For example, monitoring circuitry 101 may communicate with an off-chip analyser via communication interface 204. Communication interface 204 may also be configured to communicate with other entities on-chip. For example, monitoring circuitry 101 may communicate with an on-chip analyser via communication interface 204.

Although FIG. 2 illustrates one communication interface, any number of communication interfaces can be integrated onto the SoC. The communication interfaces implemented are chosen in dependence on the type of connections that are to be made. Exemplary communication interfaces include: JTAG, parallel trace input/output, and Aurora based high-speed serial interface; and reuse of system interfaces such as USB, Ethernet, RS232, PCIe and CAN. Within monitoring circuitry 101, there may be distinct monitoring circuitry associated with each core device. Alternatively, or in addition, some monitoring circuitry may be associated with two or more core devices. Alternatively, or in addition, one core device may be associated with more than one set of monitoring circuitry. In one example, a core device of FIG. 2 is a processor, and that processor is monitored by tracing circuitry of the monitoring circuitry 101. The processor may, for example, be a CPU, GPU or DSP.

An integrated circuit chip may comprise a plurality of monitoring circuitry modules 101. Each set of monitoring circuitry may have a distinct local subsystem that is monitored. Alternatively, or in addition, some monitoring circuitry may be associated with two or more local subsystems. Alternatively, or in addition, two or more local sub-systems may be associated with one set of monitoring circuitry.

In some circumstances, for example, if a security breach or bug is detected by one set of monitoring circuitry, it may be necessary to distribute a trigger to the other monitoring circuitry modules. In such an event, on receipt of the trigger, the local subsystem associated with each monitoring circuitry module may be shut down or otherwise modified for safety or security. In this case, it is desirable for the event to be communicated to each of the other monitoring circuitry modules and its associated subsystem(s) as quickly as possible.

In large SoC designs, it is often desirable to use a NoC as the transport mechanism for messages, or events, between devices. It may be necessary to convert SoC messages to and from the NoC native protocol, if the protocol used by the SoC is different. A NoC bridge unit provides a mechanism for converting SoC messages to and from the NoC native protocol. The NoC bridge connects each SoC component via message interfaces and may also be responsible for managing, addressing and distributing events.

The NoC bridge can provide an interface for connecting to a NoC. Messages and/or events from the SoC may be converted into packets to be transported across the NoC to another instance of a NoC bridge, where they are converted back to SoC messages or events.

In one exemplary embodiment, the NoC bridge provides an interface for connecting to an AXI4-based NoC. AXI is an example of a NoC interface protocol. SoC messages and/or events can be converted into AXI transactions to be transported across the NoC to another instance of a NoC bridge, where they are converted back to SoC messages or events. The bridge may alternatively facilitate the transport of different types of interconnect transactions.

The following description relates to transporting data packets between different NoC bridge units. For event distribution in an AXI-variant bridge, references to "packets" may be replaced with "AXI transactions". The example described below may also apply more generally to any network which uses a protocol in which one-to-one communication is permitted. In other words, in any network in which communication units operate according to a protocol in which a data packet sent by one unit is receivable by one unit only.

Figure 3:
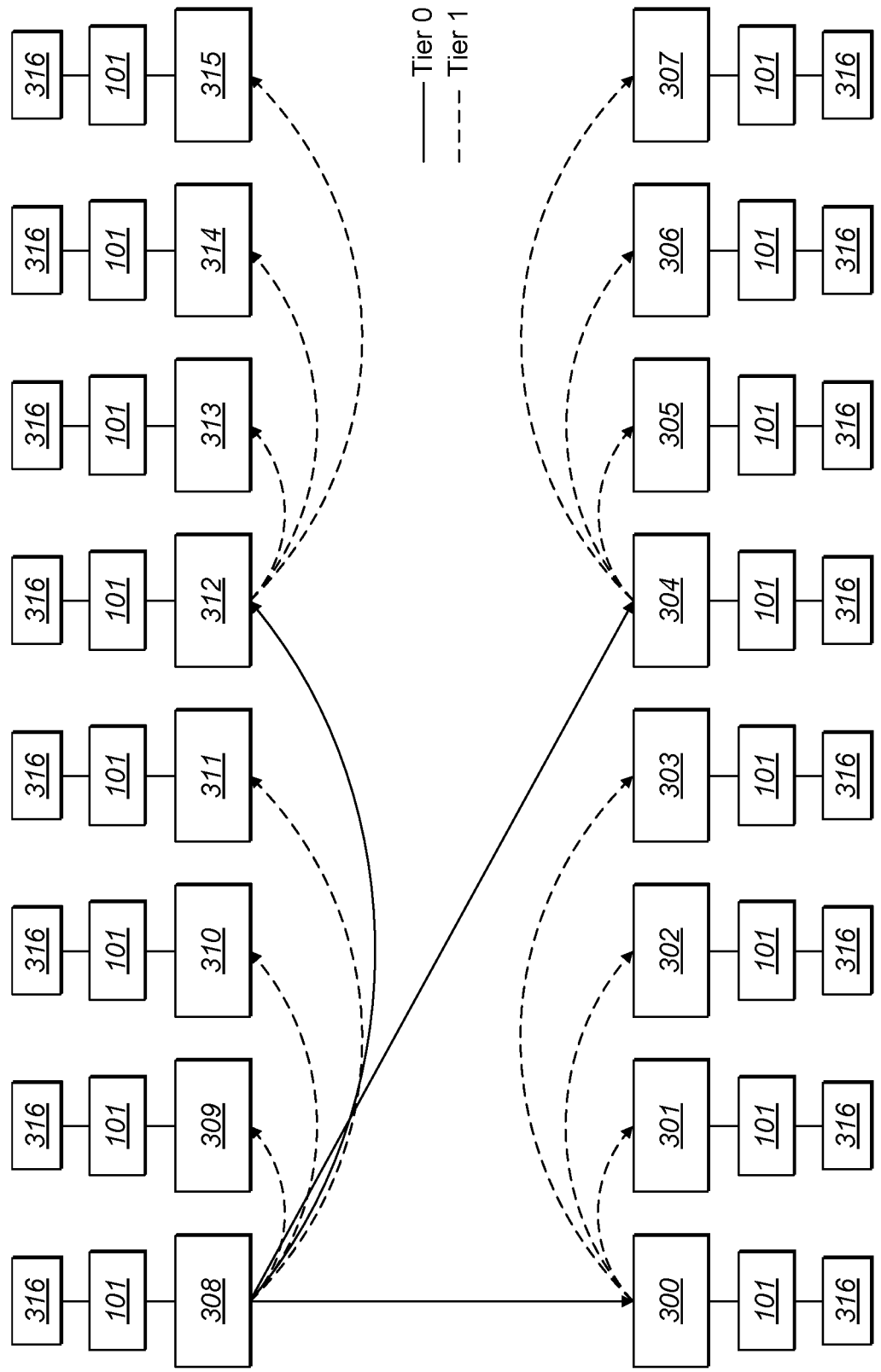
FIG. 3 illustrates an architecture for communication between a set of units over a NoC.

In the example of FIG. 3, an integrated circuit is formed on a single semiconductor substrate. The integrated circuit comprises sixteen bridge units, 300-315. Each unit communicates with a respective monitoring circuitry module 101 and its local subsystem 316 on the SoC.

Each unit 300-315 may comprise a protocol processor that packages message data into appropriately formatted packets and transmits them to the intended destination over a remote interface. At the opposite end of the link, in the receiving unit, a similar protocol processing engine receives the packets over its remote interface, extracts the payload or traffic data from the packets and presents it to its host unit over its local interface. The processing engines of each unit may also handle ancillary tasks such as checking received data for errors, requesting retransmission or providing acknowledgements, and link synchronisation.

Figure 4:
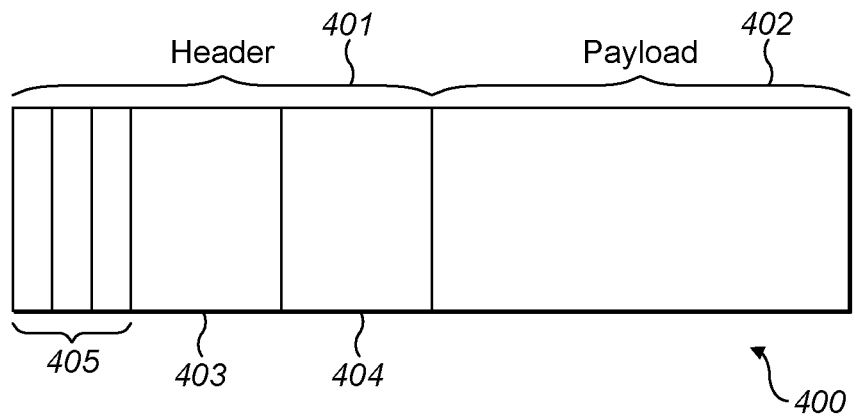
FIG. 4 shows an example of a data packet.

Communication units 300-315 within the NoC communicate according to the protocol of the network via data packet exchange. FIG. 4 illustrates an example of a data packet 400. The packet 400 includes a header 401 and a payload 402. The payload comprises the data to be communicated. The payload may comprise the message, or event. The header comprises an address field 403 for indicating an intended destination of the packet. A tier number is also included in the packet data for indicating the tier of the data packet, which is used to distribute the packets, as will be described in more detail below. The header may comprise a tier identifier field 404 for indicating the tier of the data packet. The tier of the packet may alternatively be indicated in the payload of the packet. Other fields 405 may also be in the header, for example fields indicating the length of the payload, the priority level of the data, error correction bits etc.

Each bridge unit 300-315 specifies independently for each tier it supports: (i) a predetermined number of packets to generate; and (ii) a subset of destination units to send them to. In this example, a two-tier approach is used (tier-0 and tier-1) to distribute packets between the bridge units 300-315. When a message or event $E_{num}$ is received on the message interface of a first unit, such as 308 (though any unit may initiate the event), a series of packets are generated and sequentially sent to all configured destinations for that unit. Unit 308 is configured to generate and send tier-0 packets to the subset of units 300, 304 and 312 and tier-1 packets to the subset of units 309, 310 and 311. Tier-0 packets contain $\{0, E_{num}\}$ as their payload and tier-1 packets carry $\{1, E_{num}\}$ as their payload.

Bridge unit 312 receives a tier-0 packet from unit 308. Unit 312 is pre-configured to generate and send tier-0 packets to units 0, 4 and 8 and tier-1 packets to units 13, 14 and 15. Unit 312 determines that it has received a tier-0 packet. It may do this by reading the packet data, for example by reading the header of the packet, where the tier number of the packet may be specified. Unit 312 then generates three tier-1 packets with payload $\{1, E_{num}\}$ and sequentially sends them to units 313, 314 and 315. In other words, unit 312 generates and sequentially sends packets to each of its configured subsets of destination units for the tier(s) above the tier of the received packet. No packets are sent to the tier-0 units specified for this unit, as the packet received by unit 312 is a tier-0 packet. In other words, packets are not sent to the configured subset of units for the same tier as the tier of the received packet (or tiers below the tier of the received packet, if applicable). Unit 312 also emits the numbered event $E_{num}$ on its message interface to its local subsystem 316.

Bridge units 300 and 304 behave similarly to bridge unit 312. Bridge unit 300 sends tier-1 packets to bridge units 301, 302 and 303 and bridge unit 304 sends tier-1 packets to bridge units 305, 306 and 307.

Bridge units 309, 310 and 311 each receive a tier-1 packet from bridge 308. In the example of FIG. 3, there are no higher tier packets (i.e. packets with tiers higher than tier-1) to send. However, if these units were configured to send packets to further units on higher tiers, bridge units 309, 310 and 311 would then send packets on all tiers above tier-1 to their configured destination units, as well as emit the numbered event on their message interfaces.

Similarly, units 313, 314 and 315 each receive tier-1 packets sent by unit 312. Each unit emits the numbered event on the message interface. These units 313, 314 and 315 have no further packets to send on to higher tiers in the example of FIG. 3. However, if, for example, if these units were pre-configured to send tier-2 or tier-3 packets, these would then be distributed further from these units after receiving the tier-1 packets.

Therefore, preferably, the lowered-numbered tiers are serviced first, as they may trigger additional packets, helping to reduce the overall latency.

As described above, each unit is configured to specify, for each tier, a subset of destination units to which packets of that tier are to be sent. An example of the parameters used to specify the number of packets to generate for each tier and their destination units are shown below for the units 308, 309, 312 and 313 of FIG. 3.

Bridge 308:
event_tiers_p={0,0,3,3}
ust_event_tiers_ip={0,0,3,3}
ust_event_destinations_ip={{ },{ },{9,10,11},{0,4,12}}
Bridge 309:
event_tiers_p={0,0,3,3}
ust_event_tiers_ip={0,0,3,3}
ust_event_destinations_ip={{ },{ },{8,10,11},{1,5,13}}
Bridge 312:
event_tiers_p={0,0,3,3}
ust_event_tiers_ip={0,0,3,3}
ust_event_destinations_ip={{ },{ },{13,14,15},{0,4,8}}
Bridge 313:
event_tiers_p={0,0,3,3}
ust_event_tiers_ip={0,0,3,3}
ust_event_destinations_ip={{ },{ },{12,14,15},{1,5,9}}

In this example, each unit is configured with the maximum number of packets to generate in each of the tiers using event_tiers_p, where bits [7:0] specify the maximum number of packets for tier-0, bits [15:8] correspond to tier-1, etc.

The destination to which the events are to be sent are specified using the input parameter ust_event_destinations_ip. This bus is sized based on the parameters event_tiers_p and hp_width_p.

The actual number of events to generate in each tier can be modified by using the ust_event_tiers_ip input, where bits [7:0] specify the actual number of event for tier-0, etc. This allows for the reuse of subsystems containing a NoC bridge, for example, in a tiled-design, where sub-systems are synthesised, placed and routed once.

In the example described above, it may be useful for the following constraints to be met.

For event_tiers_p, if the configured maximum number of events for a tier is 0, all higher tiers should preferably also be configured with 0 events. For example, the following combination is not preferred because it specifies 0 events for tier-2 and a non-zero (4) number for tier-3:
event_tiers_p={0x04, 0x00, 0x10, 0x1}

A similar constraint may apply to ust_event_tiers_ip, which specifies the actual number of events to generate per-tier. The actual number of events to generate, per-tier, should be less than or equal to the configured maximum. This means that byte-wise, ust_event_tiers_ip should be less than or equal to event_tiers_p.

The event destinations vector ust_event_destinations_ip may be constructed as follows:
ust_event_destinations_ip=
{last-tier-3-destination, . . . , first-tier-3-destination,
last-tier-2-destination, . . . , first-tier-2-destination,
last-tier-1-destination, . . . , first-tier-1-destination,
last-tier-0-destination, . . . , first-tier-0-destination}

Each unit may, for a given tier, start with the "first" destination and finish with the "last" destination (which is determined by the lower of the "maximum" and "actual" number of events for the tier), before proceeding to the next tier.

The values specified in the event destination vector should be of hp_width_p width.

The order of destinations to which packets are sequentially sent may be pre-defined. It may be integrator defined. The respective unit may iterate over the list of destinations. A destination which is known to incur higher latency across the NoC may be specified earlier in the destination list. The sequence in which packets are sent may be configured to result in the lowest possible latency for processing multi-tiered events.

Figure 5:
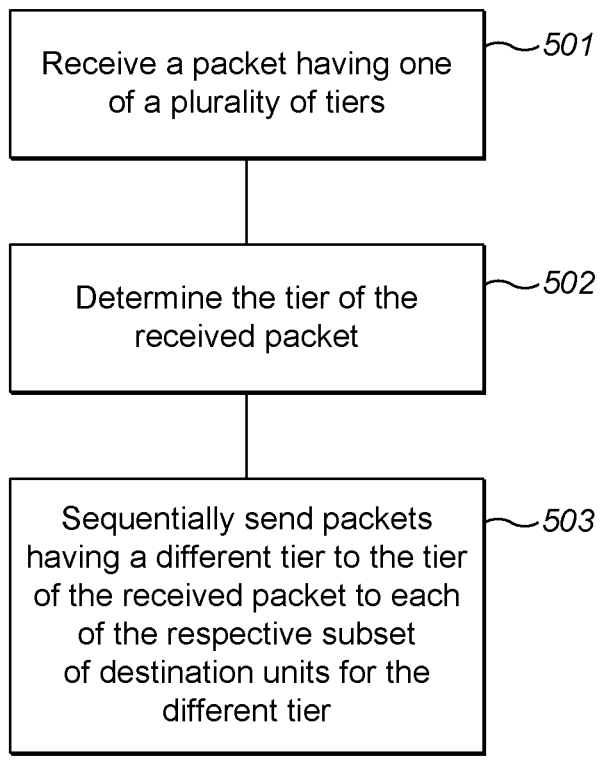
FIG. 5 shows an example of a method for implementation on an integrated circuit chip.

FIG. 5 summarises an example of a method according to the present invention for implementation on an integrated circuit chip comprising a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent. The method comprises, at step 501, receiving a packet having one of the plurality of tiers. At step 502, the tier of the received packet is determined. At step 503, packets having a different tier to the tier of the received packet are sequentially sent to each of the respective subset of destination units for the different tier.

Therefore, the system of the present invention uses a distributed tier structure, treating at least some units in the NoC as bridges which propagate the message or event to a subset of other units. The tier of the packet is determined by the receiving unit and is used to identify whether it is to route the message or event on by generating additional packets, and if so, to which other units.

Preferably, messages or events should be sent to all units in the system, which means that a packet should be sent to each of them. When using traditional methods, generating all of the packets in the unit which first received the event on its message interface may incur a significant serialization latency unless the number of units is small. It may also require full connectivity within the NoC, potentially adding significant amount of resources.

Using the multi-tiered approach of the present invention, the unit which first receives the message or event may therefore emulate broadcast while sequentially sending one message at a time. The tiered distribution of messages may reduce the time to send the message to every other unit in the network.

In a preferred embodiment, there are up to four levels of tiering. However, further levels of tiering may be implemented.

In the example described with respect to FIG. 3, each unit is configured to sequentially send packets to each of the respective subsets of destination units for the tiers above the tier of the received packet. However, the units may send packets to subsets of destination units in any tier(s) that is/are different to the tier of the received packet.

The data packets sent between the units may be uni-cast packets or multi-cast (e.g. ethernet) packets.

The system and method described above may be used in the following exemplary situations. The method may be used when it is desirable to initialise the memory of the devices in the local subsystems at start up by sending packets to each of the units which may include a 'wakeup' message. The method may also be used when it is desirable to distribute a message to the units or the devices in the local subsystem to which they may respond to indicate what their current state is, such as a security or safety state. Furthermore, the units or the devices in the local subsystem may be configured to perform a particular method when they receive a packet that contains a particular message, set of instructions or trigger. The method may also be used to send upstream messages to the devices in the local subsystem which contain data used to configure the devices.

Each component of the systems illustrated in FIGS. 1 to 3 may be implemented in dedicated hardware. Alternatively, each component of the systems illustrated in FIGS. 1 to 3 may be implemented in software. Some components may be implemented in software, whilst other components are implemented in dedicated hardware.

The system described is suitably incorporated within a computing-based device. The computing-based device may be an electronic device. Suitably, the computing-based device comprises one or more processors for processing computer executable instructions to control operation of the device in order to implement the methods described herein. The computer executable instructions can be provided using any computer-readable media such as a memory. The methods described herein may be performed by software in machine readable form on a tangible storage medium. Software can be provided at the computing-based device to implement the methods described herein.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An integrated circuit chip comprising a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent, wherein each unit is configured to:
receive a packet having one of the plurality of tiers;
determine the tier of the received packet; and sequentially send packets having a different tier to the tier of the received packet to each of the respective subset of destination units for the different tier.

2. The integrated circuit chip as claimed in claim 1, wherein each unit is configured to sequentially send packets to each of the respective subsets of destination units for the tiers above the tier of the received packet.

3. The integrated circuit chip as claimed in claim 1, wherein each of the units is further configured to specify, for each tier, a number of packets of that tier to be generated by that unit and, upon receiving a packet, generate the specified number of packets for the different tier.

4. The integrated circuit chip as claimed in claim 1, wherein a first unit of the plurality of units is configured to sequentially send packets having a first tier to a first subset of the units, each of the first subset of units being configured to subsequently sequentially send packets having a second tier to each of a second subset of the units, wherein the first tier is lower than the second tier.

5. The integrated circuit chip as claimed in claim 4, wherein each of the first subset of units is further configured to subsequently sequentially send packets having the second tier to each of a third subset of the units.

6. The integrated circuit chip as claimed in claim 4, wherein each of the second subset of units is configured to, upon receiving a packet from one of the first subset of units, subsequently send a packet having a third tier to each of a fourth subset of the units, wherein the second tier is lower than the third tier.

7. The integrated circuit chip as claimed in claim 1, wherein each communication unit is configured to sequentially send packets having a lower tier to their respective subset of destination units before packets having a higher tier.

8. The integrated circuit chip as claimed in claim 1, wherein the plurality of communication units comprises a network and each unit is configured to communicate with an entity exterior to the network.

9. The integrated circuit chip as claimed in claim 8, wherein each of the units is configured to convert the format of a message received at that unit from its respective entity from the message format used by the entity to the message format used by the network.

10. The integrated circuit chip as claimed in claim 1, wherein each of the plurality of units comprises a message interface and, upon receiving a packet, each unit is configured to display an element of the data comprising the packet on its respective message interface.

11. The integrated circuit chip as claimed in claim 1, wherein the packet comprises data that specifies the tier of the packet.

12. The integrated circuit chip as claimed in claim 11, wherein the packet comprises a header and a payload, the header comprising data that specifies the tier of the packet.

13. The integrated circuit chip as claimed in claim 1, wherein the packet comprises a trigger.

14. A method for implementation on an integrated circuit chip comprising a set of communication units, each unit being configured to operate according to a protocol in which a data packet sent by one unit is receivable by one unit only, each unit being configured to send at least one packet having one of a plurality of tiers to at least one other unit and being configured to specify, for each tier, a subset of destination units to which packets of that tier are to be sent, the method comprising:
  receiving a packet having one of the plurality of tiers;
  determining the tier of the received packet; and
  sequentially sending packets having a different tier to the tier of the received packet to each of the respective subset of destination units for the different tier.

15. The method as claimed in claim 14, wherein the method comprises sequentially sending packets to each of the respective subsets of destination units for the tiers above the tier of the received packet.

16. The method as claimed in claim 14, wherein the method comprises sequentially sending packets having a lower tier to their respective subset of destination units before packets having a higher tier.

17. The method as claimed in claim 14, wherein the plurality of communication units comprises a network and each unit is configured to communicate with an entity exterior to the network.

18. The method as claimed in claim 17, wherein each of the units is configured to convert the format of a message received at that unit from its respective entity from the message format used by the entity to the message format used by the network.

19. The method as claimed in claim 14, wherein the packet comprises data that specifies the tier of the packet.

20. The method as claimed in claim 14, wherein the packet comprises a trigger.

* * * * *